United States Patent
Boettiger et al.

(10) Patent No.: US 6,289,273 B1
(45) Date of Patent: Sep. 11, 2001

(54) MEASURING AND CONTROL SYSTEM FOR THE TRANVERSE REGULATION OF SUCCESSIVE VEHICLES AND METHOD FOR THIS PURPOSE

(75) Inventors: Friedrich Boettiger, Esslingen; Hans Fritz, Ebersbach/Fils, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/561,904

(22) Filed: May 1, 2000

(30) Foreign Application Priority Data

Apr. 30, 1999 (DE) .............................................. 199 19 644

(51) Int. Cl.[7] .................................................... G05D 1/00
(52) U.S. Cl. .............................. 701/96; 701/300; 340/903
(58) Field of Search .............................. 701/96, 300, 93; 340/903, 904

(56) References Cited

U.S. PATENT DOCUMENTS

| | | | |
|---|---|---|---|
| 5,768,131 | * | 6/1998 | Lissel et al. ........................... 701/96 |
| 5,781,119 | | 7/1998 | Yamashita et al. . |
| 6,058,347 | * | 5/2000 | Yamamura et al. .................... 701/96 |
| 6,175,799 | * | 1/2001 | Tsutsumi et al. ..................... 701/300 |

FOREIGN PATENT DOCUMENTS

| | | | |
|---|---|---|---|
| 4407082A1 | of 1994 | (DE) . | |
| 0145989 | * | 6/1985 | (EP) ...................................... 701/96 |
| 360019208 | * | 1/1985 | (JP) ....................................... 701/96 |

* cited by examiner

Primary Examiner—Richard M. Camby
(74) Attorney, Agent, or Firm—Crowell & Moring LLP

(57) ABSTRACT

A measuring and control system for a vehicle, having a measuring device for measuring the spacing between a following vehicle and a leading vehicle travelling ahead. The system involves a regulating and control unit for producing actuating signals as a function of measurement signals of the measuring device. In order to implement transverse guidance of a vehicle, the drawbar angle formed during cornering between the following vehicle and the leading vehicle is determined. The drawbar angle is formed between the longitudinal axis of the following vehicle and a connecting line between the following vehicle and the leading vehicle and is determined in the measuring device as an additional measurement signal. A steering signal is produced in the regulating and control unit as an actuating signal for the transverse guidance of the following vehicle as a function of the drawbar angle.

16 Claims, 3 Drawing Sheets

MEASURING AND CONTROL SYSTEM FOR THE TRANVERSE REGULATION OF SUCCESSIVE VEHICLES AND METHOD FOR THIS PURPOSE

BACKGROUND AND SUMMARY OF THE INVENTION

This application claims the priority of German Application No. 19919644.3, filed Apr. 30, 1999, the disclosure of which is expressly incorporated by reference herein.

The invention relates to a measuring and control system and method for the transverse regulation of successive vehicles.

Such a system is disclosed in German Reference DE 44 07 082 A1, which has a vehicle-speed control system for controlling the speed of a vehicle following a vehicle travelling ahead. As a function of the spacing and relative velocity, actuating signals for adjusting the transmission and the throttle valve are produced in a regulating and control unit of the system in order to adjust the spacing between the controlled vehicle and the vehicle travelling ahead as a function of the velocity. A steering-angle sensor for measuring the current steering angle of the controlled vehicle is furthermore provided. The steering angle is used to determine the road curvature but active automatic intervention into the steering angle is not provided.

U.S. Pat. No. 5,781,119 discloses adjusting the lateral position of a vehicle in relation to a vehicle travelling ahead. Based on a lateral deviation, the steering angle is adjusted to correct the relative vehicle position, taking into account the instantaneous vehicle speed. The lateral position of the vehicle travelling ahead is determined by means of a guide in the roadway and transmitted to the following vehicle, in which a steering-angle correction is performed to adjust the transverse spacing. The lateral position of the following vehicle is not measured.

This system has the disadvantage that continuous data exchange is necessary between the vehicle travelling ahead and the following vehicle in order to allow transverse adjustment of the following vehicle to be performed, and this necessitates a high outlay both in terms of system components and information processing. Failure in the device for determining the lateral position of the leading vehicle necessarily leads to failure of lateral correction of the following vehicle.

One object of the present invention is to implement automatic transverse guidance of a vehicle following a leading vehicle by simple means and in a reliable manner.

This and other objects and advantages are achieved by the measuring and control system of the present invention which is fundamentally based on the utilization of the drawbar angle which forms between the longitudinal axis of the following vehicle and a connecting line between the leading and following vehicle during cornering. The system is also based on the vehicle speed of the following vehicle and the vehicle spacing between the leading vehicle travelling ahead and the following vehicle. However, neither communication devices between the vehicles nor structural measures for vehicle guidance or in at the edge of the road are required owing to this simplified system and method, a reduction in costs and a significant increase in operational reliability is achieved and, furthermore, flexible adaptation to different operating conditions and different vehicle types is possible.

The drawbar angle is, in particular, the angle between the longitudinal axis of the following vehicle and a connecting line passing through the front axle of the following vehicle and the rearmost axle of the leading vehicle.

The new measuring and control system of the present invention makes it possible for the rearmost axles of the leading vehicle and the following vehicle to travel along the same track during cornering. One of the obvious advantages, particularly in the case of following vehicle combinations or semitrailer tractors with semitrailers, of this type of transverse regulation is the prevention of the rearmost axle of the following vehicle from cutting the corner. Possible damage and danger due to corner cutting are avoided and no additional room for manevering for the following vehicle is required.

Regulation as a function of the drawbar angle allows uncomplicated and rapid adjustment to the lateral spacing of the following vehicle transversely to the longitudinal direction of the vehicle in relation to the leading vehicle.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
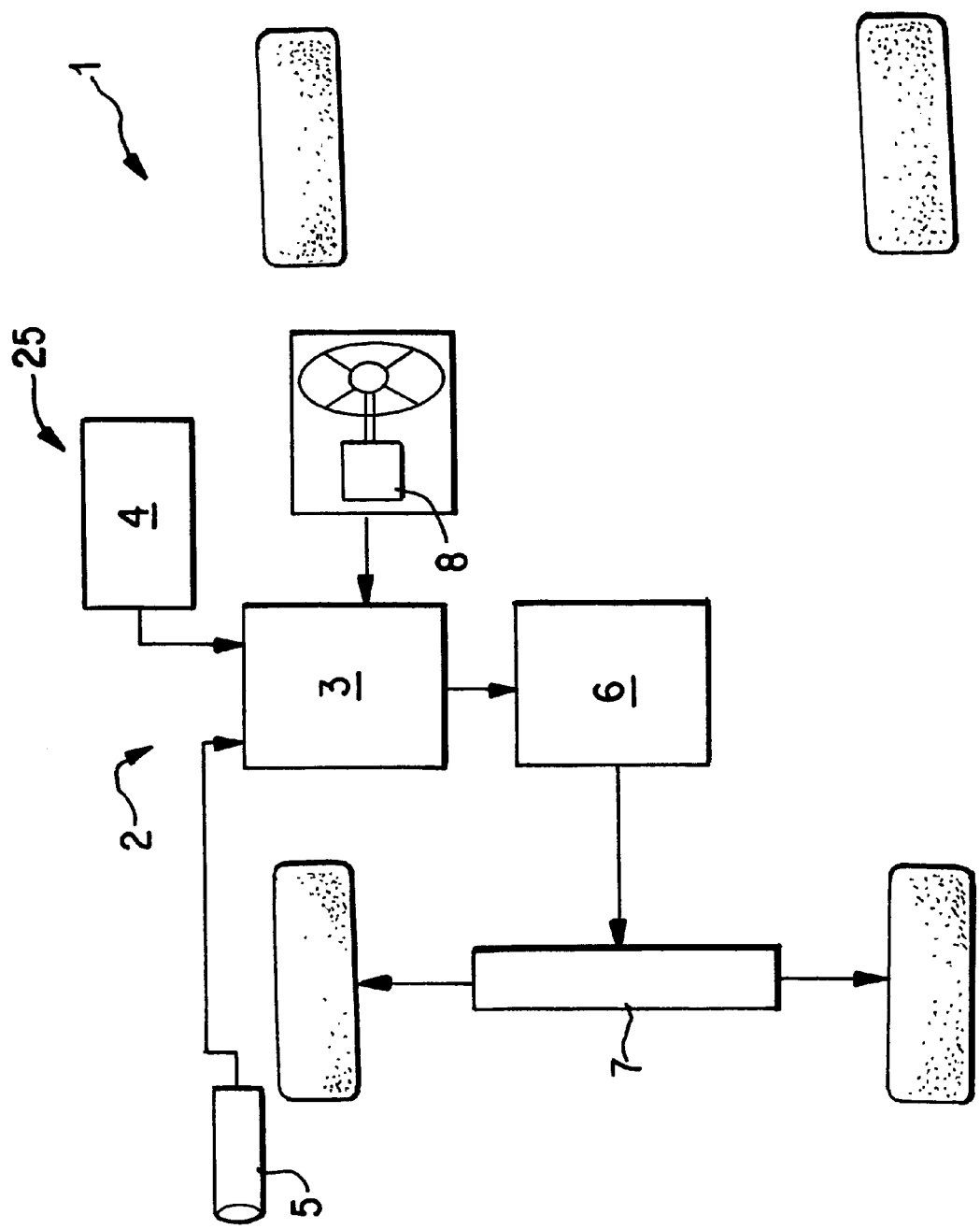
FIG. 1 shows a schematic view of a vehicle with a measuring and control system for adjusting the spacing between the vehicle and a leading vehicle.

The vehicle 1 illustrated schematically in FIG. 1 includes a measuring and control system 2 which, as a function of measurement signals recorded by a sensor with an associated measuring device 25 and of computationally derived vehicle-state and measured variables, produces actuating signals for application to control elements for adjusting the vehicle components to a desired required value. The measuring and control system 2 includes a regulating and control unit 3, the measuring device 25, a hydraulic unit 6 and a steering actuator 7. If appropriate, further actuators, in particular actuators for actuating the wheel brakes, can be provided which can likewise be acted upon by the regulating and control unit 3. The measuring device 25 comprises a detection device 4, a spacing detection device 5 and a measurement transmitter 8. In the regulating and control unit 3, it is possible to produce actuating signals for application to the hydraulic unit 6 for providing signals for adjusting the steering actuator 7 for steering the front wheels.

As an alternative to a hydraulic unit for control of the steering it is also possible to use a torque motor directly on the steering column.

The regulating and control unit 2 processes measurement signals which are produced in the detection unit 4 and the spacing detection unit 5, and also processes measured and state variables, in particular the steering angle or variables derived from the steering angle which represent the current state of the steering and are recorded by means of the measurement transmitter 8. It is expedient if vehicle-specific state variables, in particular the vehicle speed and, if appropriate, the slope of the road, the friction coefficient between the road and the vehicle etc., are determined in the detection unit 4 and if vehicle-specific parameters, in particular geometry parameters, are stored in the unit 14. It is advantageous if the spacing detection device 5 is designed as a video-based image processing system, making it possible to measure both the spacing between the vehicle and a vehicle travelling ahead of it and the lateral spacing or drawbar angle, which is formed between the longitudinal axis of the vehicle illustrated and a connecting line which passes through the front axle of the vehicle and the rear axle of a leading vehicle travelling ahead of it.

Both the measurement signals of detection device 4 and detection device 5 and the signals from the measurement transmitter 8 are fed to the regulating and control unit 3 as input signals. Steering-angle actuating signals are produced in the regulating and control unit 2 taking into account the measurement signals from the detection device 5, the measured and state variables and the vehicle parameters from the detection device 4 in accordance with a stored calculation rule or a stored characteristic map. The steering actuator 7 is then acted upon by the hydraulic unit 6 in accordance with the computationally determined setting of the wheel steering.

Figure 2:
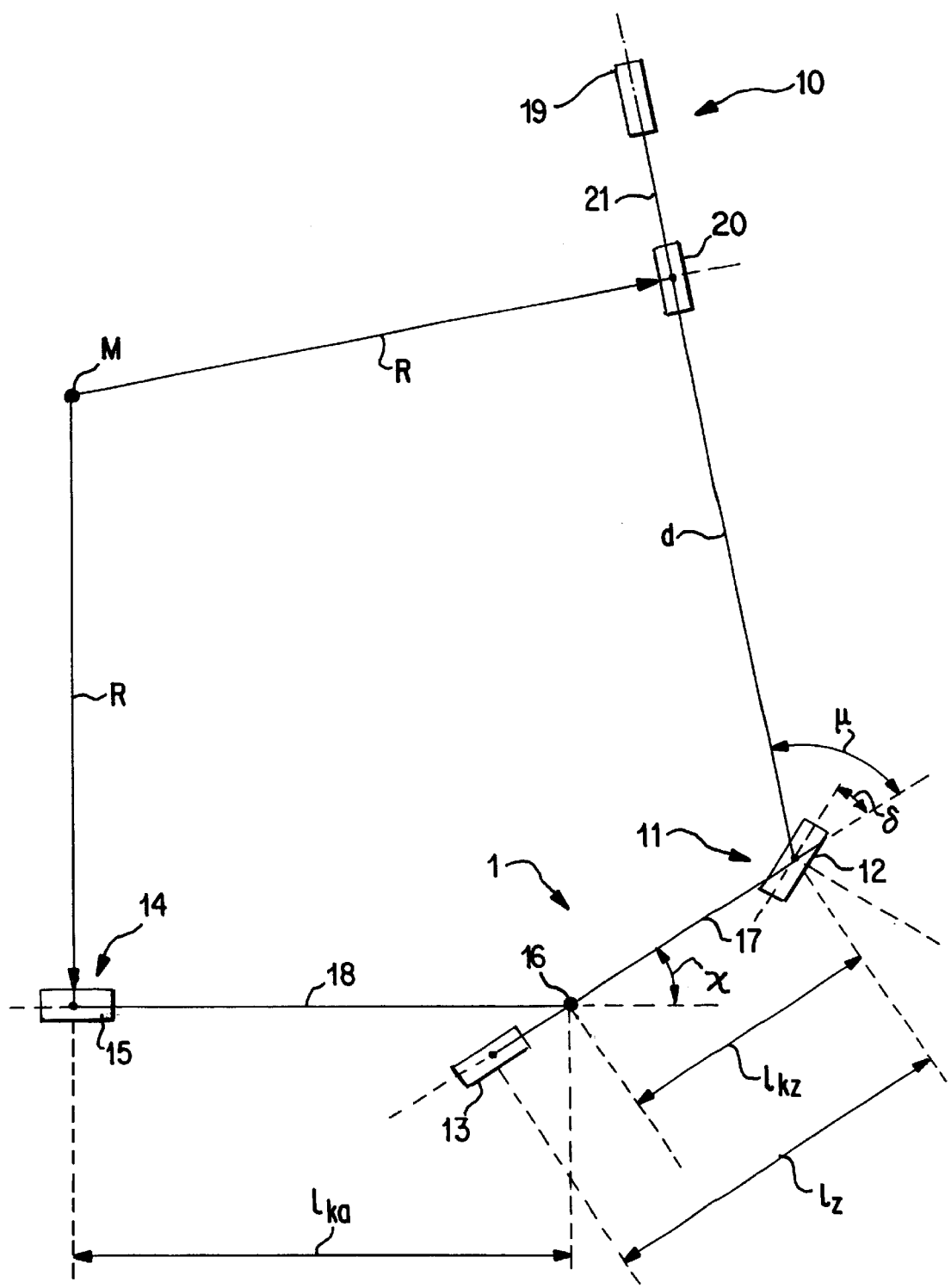
FIG. 2 shows a plan view of a leading vehicle and a multi-element following vehicle in schematic representation.

FIG. 2 shows a vehicle 1 which follows a leading vehicle 10 travelling ahead of it as a following vehicle with the aid of the measuring and control system according to the invention. The vehicle 1 is represented in simplified form as a single-track vehicle model in which the two wheels on one axle are combined into one. The following vehicle 1 is a multi-element vehicle comprising a tractor unit 11 with a front axle 12 and a rear axle 13 and also comprising a semitrailer 14 with a rear semitrailer axle 15. The tractor unit 11 and the semitrailer 14 are connected to one another by way of a coupling point 16. The semitrailer can be pivoted relative to the tractor unit at the coupling point 16 and the longitudinal axis 17 of the tractor unit 11 and the longitudinal axis 18 of the semitrailer 14 enclose an articulation angle K in the deflected state of the semitrailer 14. The spacing between the front and rear axles 12, 13 of the tractor unit 11 is denoted by $l_2$, the spacing between the front axle 12 and the coupling point 16 by $l_{kz}$ and the spacing between the rearmost semitrailer axle 15 and the coupling point 16 by $l_{ka}$.

The leading vehicle 10 is designed as a two-axle vehicle with a front axle 19 and a rear axle 20. In the illustration in FIG. 2, the leading vehicle 10 has driven into a bend or has already travelled around a bend, and the following vehicle 1 follows the leading vehicle 1 by means of the signals of its measuring and control system. Owing to the bend scenario, the longitudinal axis 17 of the tractor unit 11 of the following vehicle 1 encloses a drawbar angle $\mu$ with the connecting line passing through the front axle of the following vehicle and the rearmost axle of the leading vehicle. The spacing between the rear axle 20 of the leading vehicle 10 and the front axle of the following vehicle 1 is denoted as the vehicle spacing d.

By virtue of the automatic setting of the wheel steering angle δ of the following vehicle 1, it is capable of travelling along the same track as the leading vehicle 10, and the rear axle 20 of the leading vehicle 10 and the rearmost semitrailer axle 15 of the following vehicle 1 thus describe a circle with a common centre M and radius R.

Figure 3:
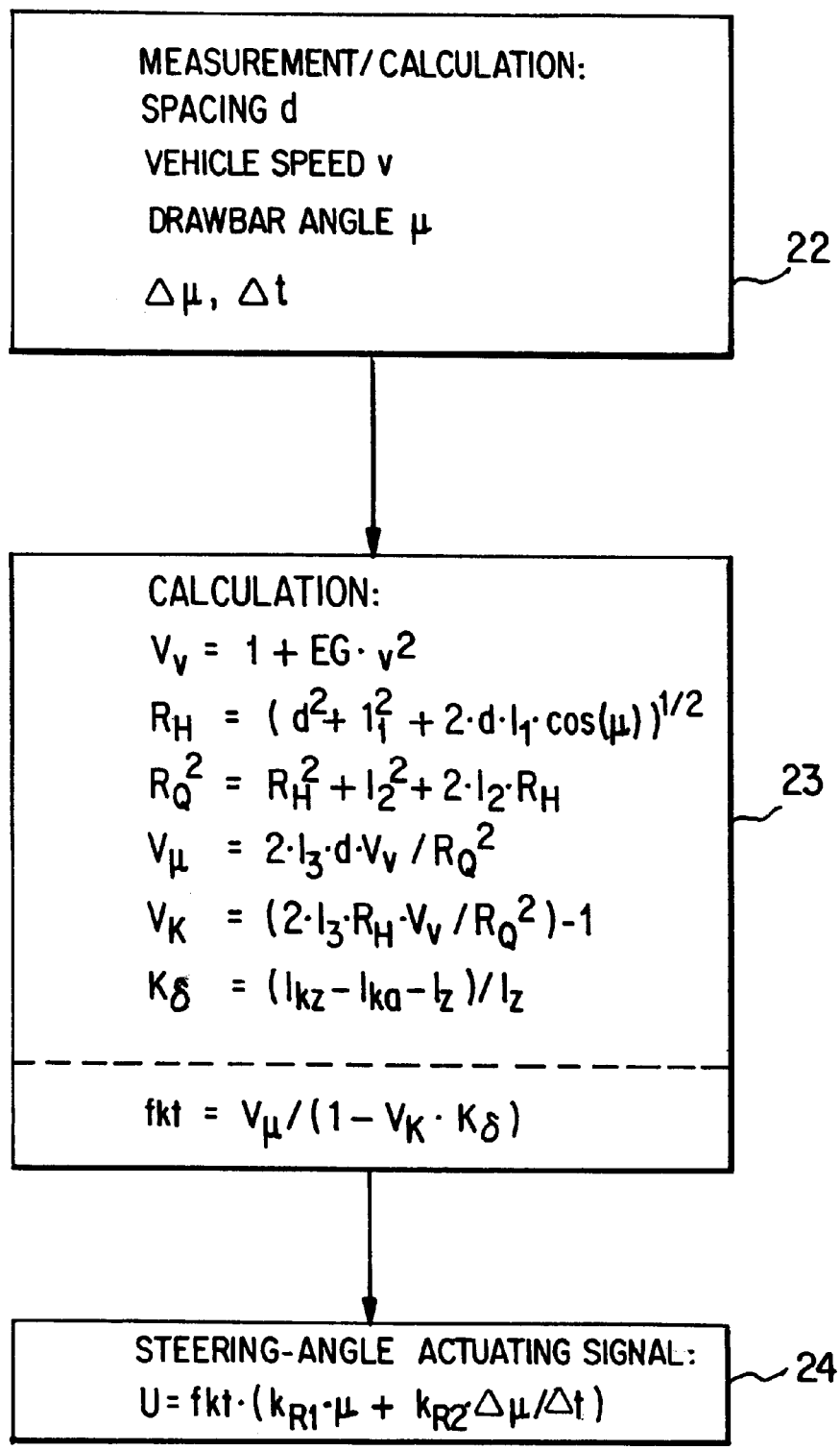
FIG. 3 shows a flow diagram containing the basic steps of the method for controlling the lateral spacing of successive vehicles during cornering.

FIG. 3 shows a flow diagram for the transverse spacing regulation of the following vehicle in relation to the leading vehicle. In a first method step 22, the vehicle state and operating variables which are required for transverse regulation are first of all determined by measurement and/or calculation. These variables are the spacing d between the vehicles, the drawbar angle $\mu$, the vehicle speed v of the following vehicle and, if appropriate, time differences Δt and associated drawbar-angle increments Δ$\mu$, by means of which the drawbar angular velocity can be determined, at least approximately.

In a subsequent method step 23, which functions as a calculation block, operating and state variables determined in the preceding step 22 are determined taking into account geometry parameters of the following vehicle, a drawbar-angle geometry term $V_\mu$, and articulation-angle geometry term $V_K$ and a geometry term $K_S$, the terms $V_\mu$ and $V_K$ depending on a speed term $V_v$. In accordance with a stored calculation rule, these terms enter into the calculation of a function fkt which contains as a variable the vehicle speed v, the vehicle spacing d and the drawbar angle $\mu$.

The speed term $V_v$ is determined in accordance with the relation $$V_v = 1 + EG * v^2$$

as a function of the square of the speed, EG denoting the vehicle-specific self-steering gradient, which is stored as a parameter in the system.

If the following vehicle is moving at a low speed below a speed threshold, it is possible to dispense with the calculation of the speed term $V_v$. In this case, the speed term $V_v$ is reduced to the value $V_v = 1$.

The drawbar-angle geometry term $V_\mu$ is calculated in accordance with the relationship $$V_\mu = 2 * l_3 * d * V_v / R_Q^2$$

$$R_Q^2 = R_H^2 + l_2^2 + 2 * l_2 * R_H$$

$$R_H = (d^2 + l_1^2 + 2 * d * l_1 * \cos(\mu))^{1/2}$$

as a function of the spacing d between the leading vehicle and the following vehicle, the drawbar angle $\mu$ and the three equivalent geometry variables $l_1$, $l_2$ and $l_3$ of the following vehicle, auxiliary variables $R_Q$ and $R_H$ having been introduced to simplify calculation.

The equivalent geometry variables $l_1$ to $l_3$ depend on whether the following vehicle is a single-element vehicle without a trailer or semitrailer, where no articulation angle can occur over the length of the vehicle, or a multi-element vehicle with a tractor unit and a trailer or semitrailer, where a possible articulation angle must be taken into account.

In the case of a multi-element vehicle in accordance with FIG. 2, the first equivalent geometry variable $l_1$ corresponds to the spacing $l_{kz}$ between the front axle of the tractor unit and the coupling point to the trailer or semitrailer, the second equivalent geometry variable $l_2$ corresponds to the spacing $l_{ka}$ between the coupling point and the rearmost axle of the trailer or semitrailer and the third equivalent geometry variable $l_3$ is identical with the sum of the first and second equivalent geometry variables.

The articulation-angle geometry term $V_K$ likewise comes into play in the case of multi-element vehicles, being determined in accordance with the rule $$V_K = (2 * l_3 * R_H * V_v / R_Q^2) - 1$$

as a function of the spacing d and of the auxiliary variables $R_H$ and $R_Q$.

The geometry term $K_S$ is also restricted to multi-element vehicles, and the second geometry term $K_S$ is calculated exclusively as a function of vehicle-specific geometry parameters in accordance with the relation $$K_\delta = (1_{kz} + 1_{ka} - 1_z)/1_z.$$

Once all necessary preliminary calculations have been carried out for the function fkt, this function can then be calculated as a function of the vehicle spacing d and the speed v of the following vehicle in accordance with the rule $$fkt = V_\mu/(1 - V_K * K_\delta)$$

which is taken into account for the production of the steering-angle actuating signal U, which is produced in the last method step 24 in FIG. 3 in accordance with the relation $$U = fkt * (k_{R1} * \mu + k_{R2} * \Delta\mu/\Delta t)$$

as a function of the drawbar angle $\mu$ and the drawbar angular velocity $\Delta\mu/\Delta t$ approximately calculated. $k_{R1}$ and $k_{R2}$ denote controller parameters, which can be constant or can depend on the speed of the following vehicle. If appropriate, the speed term $V_v$ can be left out of account, irrespective of the speed, resulting in a corresponding simplification of the drawbar-angle geometry term $V_\mu$ and the articulation-angle geometry term $V_K$.

The actuating signal U is used as a basis for adjusting a steering actuator of the following vehicle. Method steps 22 to 24 are executed cyclically in order to achieve continuous and up-to-date adaptation of the cornering path of the following vehicle to the cornering path of the leading vehicle.

In the case of a single-element vehicle, calculation of the actuating signal U is simpler. In the case of single-element following vehicles, both the first equivalent geometry variable $1_1$ and the third equivalent geometry variable $1_3$ are identical with the wheelbase lz of the following vehicle and the second equivalent geometry variable $1_2$ is equal to zero, with the result that the drawbar-angle geometry term $V_\mu$ is reduced to the relation $$V_\mu = 2 * 1_z * d * V_v / R_H^2$$

$$R_H = (d + 1_z^2 + 2 * d * 1_z * \cos(\mu))^{1/2}.$$

In the case of single-element following vehicles, the second geometry term $K_\delta$ is set to zero. This simplifies the calculation rule for the function fkt to $$fkt = V_\mu.$$

If appropriate, the speed term $V_v$ can be set to one.

Otherwise, the steering-angle actuating signal U is determined in the same way as for multi-element vehicles as a function of the function fkt, of the drawbar angle $\mu$ and, if appropriate, of the drawbar angular velocity $\Delta\mu/\Delta t$.

In the case of a small drawbar angle $\mu$, the relation for the auxiliary variable $R_H$ can be linearized to give $$R_H = (d + 1_1).$$

Taking into account the auxiliary variables $R_H$ linearized in this way, the relations for the drawbar-angle geometry term $V_\mu$ and the articulation-angle geometry term $V_K$ can be formulated independently of the drawbar angle $\mu$ in accordance with $$V_\mu = 2 * 1_3 * d * V_v / (1_1 + 1_2 + d)^2$$

$$V_K = (2 * 1_3 * (1_1 + d) * V_v / (1_1 + 1_2 + d)^2) - 1.$$

It may be expedient to combine a measuring and control system or the method with a lateral guidance system for the following vehicle, e.g. a system for image acquisition or lateral guidance by means of lines embedded in the roadway in order, when appropriate, to permit correction of the path of the following vehicle. It is thereby possible to ensure that an unfavourable or dangerous path of the leading vehicle travelling ahead does not lead to a dangerous situation involving the following vehicle. It is furthermore possible to achieve higher accuracy of lateral guidance.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A measuring and control system for a first following vehicle, comprising:

a measuring device for measuring a spacing between said first following vehicle and a second leading vehicle;

a regulating and control unit for producing actuating signals (U) as a function of measurement signals output from said measuring device, wherein said regulating and control unit comprises:

means for measuring a drawbar angle between said first following and said second leading vehicle during cornering or a lateral offset between the leading vehicle and said first following vehicle, said drawbar angle being an angle between a longitudinal axis of the following vehicle and a connecting line between said first following vehicle and said second leading vehicle;

means for providing an output steering angle signal as an actuating signal for transverse guidance of said first following vehicle wherein said output steering angle signal is a function of said drawbar angle ($\mu$) in accordance with;

$$U = fkt * \mu$$

where

U is the steering signal, fkt is a multiplier; and $\mu$ is the drawbar angle.

2. Measuring and control system according to claim 1, wherein the multiplier is a function dependent on the vehicle spacing (d) in accordance with the relationship $$fkt = fkt(d)$$

where d is the vehicle spacing between the second leading vehicle and the first following vehicle.

3. Measuring and control system according to claim 1, wherein the vehicle spacing (d) denotes the spacing between the front axle of the first following vehicle and the rear axle of the second leading vehicle (10).

4. Measuring and control system according to claims 1, wherein the function (fkt) is a function of the drawbar angle ($\mu$) of the following vehicle (1).

5. Measuring and control system according to claim 2, wherein the function (fkt) is determined in accordance with the relation $$fkt = V_\mu/(1 - K_\delta * V_K)$$

in which $V_\mu$ denotes a drawbar-angle geometry term as a function of the spacing (d) with respect to the second leading vehicle and of at least one of the drawbar angle ($\mu$) and the vehicle speed (v) of the first following vehicle, $V_K$ denotes an articulation-angle geometry term as a function of the spacing (d) with respect to the second leading vehicle (10) and of at least one of the drawbar angle ($\mu$) and the vehicle speed (v) of the first following vehicle, $K_\delta$ denotes a geometry term as a function of parameters which describe the vehicle geometry of the first following vehicle (1).

6. Measuring and control system according to claim 5, wherein a drawbar-angle geometry term ($V_\mu$) is determined in accordance with the relation $$V_\mu = 2*l_3*d*V_v/R_Q^2 \text{ where}$$

$$V_v = 1 + EG*v^2$$

$$R_Q^2 = R_H^2 + l_2^2 + 2*l_2*R_H$$

$$R_H = (d^2 + l_1^2 + 2*d*l_1*\cos(\mu))^{1/2}$$

in which $V_v$ denotes a speed term as a function of the vehicle speed (v) of the first following vehicle, EG denotes the vehicle-specific self-steering gradient, v denotes the speed of the first following vehicle, RQ denotes a first auxiliary variable, RH denotes a second auxiliary variable, $l_1, l_2, l_3$ denotes equivalent geometry variables of the first following vehicle.

7. Measuring and control system according to claim 5, wherein an articulation-angle geometry term ($V_K$) is determined in accordance with the relation $$V_K = (2*l_3*R_H*V_v/R_Q^2) - 1.$$

8. Measuring and control system according to claim 6, wherein in the case of a single-element first following vehicle without a trailer or semitrailer, the first equivalent geometry variable ($l_1$) is identical with the wheelbase ($l_z$) of the following vehicle (1), the second equivalent geometry variable ($l_2$) is equal to zero and the third equivalent geometry variable ($l_3$) is identical with the wheelbase ($l_z$) of the first following vehicle; and the geometry term ($K_\delta$) is equal to zero.

9. Measuring and control system according to claim 6, wherein in the case of a multi-element first following vehicle including a tractor unit and a trailer or semitrailer, the first equivalent geometry variable ($l_1$) is identical with the spacing ($l_{kz}$) between the front axle of the tractor unit and a coupling point with the trailer or semitrailer, the second equivalent geometry variable ($l_2$) is identical with the spacing ($l_{ka}$) between the coupling point and the rearmost axle of the trailer or semitrailer and the third equivalent geometry variable ($l_3$) is identical with the sum of the first and second equivalent geometry variables ($l_1, l_2$), the second geometry term ($K_\delta$) is determined in accordance with the relation $$K_\delta = (l_{kz} + l_{ka} - l_z)/l_z$$

where $l_{kz}$ is the spacing between the front axle of the tractor unit and the coupling point of the trailer or semitrailer, $l_{ka}$ denotes the spacing between the coupling point and the rearmost axle of the trailer or semitrailer.

10. Measuring and control system according to claim 5, wherein the drawbar-angle geometry term ($V_\mu$) is determined in accordance with the linearized relation $$V_\mu = 2*l_3*d*V_v/(l_1+l_2+d)^2$$

for small drawbar angles ($\mu$).

11. Measuring and control system according to claim 5, wherein the articulation-angle geometry term ($V_K$) is determined in accordance with the linearized relation $$V_K = (2*l_3*(l_1+d)*V_v/(l_1+l_2+d)^2) - 1$$

for small drawbar angles ($\mu$).

12. Measuring and control system according to claim 1, wherein, when determining the steering signal (U), a controller parameter ($k_{R1}$) is taken into account in accordance with the relation $$U = fkt*k_{R1}*\mu$$

where $k_{R1}$ denotes the controller parameter.

13. Measuring and control system according to claim 1, wherein, when determining the steering angle (U), a drawbar angular velocity ($\Delta\mu/\Delta t$) is additionally taken into account in accordance with the relation $$U = fkt*(k_{R1}*\mu + k_{R2}*\Delta\mu/\Delta t)$$

where $k_{R2}$ denotes a controller parameter assigned to the drawbar angular velocity.

14. Measuring and control system according to claim 13, wherein at least one controller parameter ($k_{R1}, k_{R2}$) depends on the vehicle speed (v) of the first following vehicle.

15. A method for controlling the spacing between a following vehicle and a leading vehicle, comprising the steps of:

measuring the spacing between the following vehicle and the leading vehicle;

measuring and determining a drawbar angle ($\mu$) defined as the angle between a longitudinal axis of the following vehicle and a connecting line formed between the following vehicle and the leading vehicle in the instance of lateral offset between the leading vehicle and the following vehicle;

measuring and determining the vehicle speed of the following vehicle; and determining a steering signal (U) for the following vehicle as a function of the determined drawbar angle and as a function of at least one of the measured spacing and the following vehicle speed.

16. A method for controlling spacing between a following vehicle and a leading vehicle comprising the steps of:

measuring the spacing between the following vehicle and the leading vehicle;

determine an angular relationship between a longitudinal axis of the following vehicle and a connecting line between the following vehicle and the leading vehicle;

determine the vehicle speed of the following vehicle; and providing a steering signal for the following vehicle as a function of the measured spacing and the measured angle.

* * * * *